Feb. 24, 1970          E. I. VALYI          3,497,173

APPARATUS FOR CONTROLLING THE TEMPERATURE OF MOLD COMPONENTS

Original Filed Dec. 23, 1966

INVENTOR:
EMERY I. VALYI

BY *Robert H. Bachman*
ATTORNEY

United States Patent Office 3,497,173
Patented Feb. 24, 1970

3,497,173
APPARATUS FOR CONTROLLING THE
TEMPERATURE OF MOLD COMPONENTS
Emery I. Valyi, Riverdale, N.Y., assignor to Olin
Mathieson Chemical Corporation, a corporation
of Virginia
Original application Dec. 23, 1966, Ser. No. 604,400.
Divided and this application Nov. 13, 1968, Ser.
No. 794,818
Int. Cl. B29c 1/06; B28b 7/28; B22d 15/02
U.S. Cl. 249—79                                6 Claims

ABSTRACT OF THE DISCLOSURE

A mold member having a heat exchange means comprising an outer cover and at least one conduit disposed contiguous thereto containing a pervious element.

---

This application is a division of copending application Ser. No. 604,400, filed Dec. 23, 1966.

In the conversion of various materials, such as metals, plastics, glasses, ceramics, etc., into usable shapes, processes are employed in which these materials are molten or at least substantially heated, thereby rendering them capable of yielding under pressure. The materials thus heated are injected, or otherwise placed, into molds and caused to conform to a predetermined shape therein. Once so shaped, they are allowed to cool in these molds and removed therefrom. In other processes aimed at the shaping or treatment of materials, the tools wherein such shaping or treatment is to take place are heated, or alternately heated and cooled.

The conversion of these materials into such shapes is usually carried out at appreciable rates of speed, in order to be economical. The speed of the operations in turn depends largely upon the rate of heating or cooling, as the case may be, of the materials in the molds after the forming process is completed, and before the finished object may be removed from the mold, and the mold or tool available for the production of the next part.

Among the numerous processes of this nature, well known in industry, the following may be mentioned as examples: permanent mold casting, die casting, and hot pressing, in the case of metals; injection molding, compression molding, transfer molding, blowing, and thermoforming, in the case of polymeric materials (plastics); pressing or blowing, in the case of glass.

The processes to which reference is made here are well known in the industries employing them and their nature is sufficiently defined by the terms above used. Reference is made to The Metals Handbook, published by The American Society for Metals; The Modern Plastics Encyclopedia, published by McGraw-Hill, Inc.; and The Handbook of Glass Manufacture, published by The Ogden Publishing Co. for the definition of these terms descriptive of the respective processes.

Whenever these processes are applied, the mold members which convert the materials into finished shape are provided with means to influence and to control the temperature of the mold members. To this end, the mold members may be provided with channels through which a fluid is circulated to cool or to heat the mold members as required by the process at question and as called for by the rate of cycling of the process.

It is an object of the present invention to provide very responsive and efficient heating and/or cooling means for the molding members in the above described processes.

It is also an object of the present invention to heat or cool shaped articles using heat exchanger structures according to my co-pending application Ser. No. 398,128, now U.S. Patent 3,289,750, issued Dec. 6, 1966, assigned to the same assignee as the present application.

It is also an object of the present invention to utilize heat exchanger structures substantially in accordance with my above-mentioned co-pending application, consisting of a heat-conductively bonded composite of solid and pervious metal, wherein the heating or cooling fluid is separated from the substance to be heated or cooled by any impervious barrier, and wherein fluid circulating means are provided to effect circulation of the heating and cooling fluids within the pervious components, in processes intended to shape metals, plastics, glasses and ceramics. Such processes include, but are not limited to, permanent mold casting, hot pressing and die casting for the shaping of metals; injection molding, compression molding, transfer molding, blow molding and thermoforming for shaping polymeric materials; pressing and blowing for shaping glass; and pressing for shaping ceramic materials.

Additional and further objects will be apparent from the following description of the invention.

The nature of the present invention will be better understood by reference to the following figures which are representative of but one exemplary use of the invention in connection with tools intended for the injection molding of the plastics.

FIGURE 1 is a schematic representation of apparatus used in the injection molding of plastics.

Figure 1:
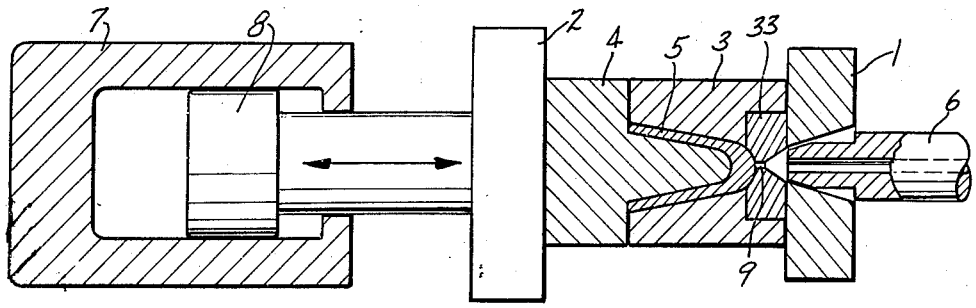
FIGURE 1 is a schematic sectional view of an injection molding machine employing tools to which the present invention relates.

FIGURE 1 depicts a press having a fixed platen 1 and a movable platen 2. A fixed mold member 3 and a sprue bushing 33 are attached to fixed platen 1. A moveable mold member 4 is attached to movable platen 2. In the position shown in FIGURE 1, these two mold members form a cavity 5 which is arranged to receive heated plastic material through nozzle 6. Heated plastic is supplied to nozzle 6 under pressure from a conventional injection unit, not shown.

Movable platen 2 is capable of reciprocation, as indicated by the arrow, such reciprocation being effected by means of hydraulic cylinder 7 and piston 8 operating therein, in a manner well known in the art.

In operation, hot flowable material is caused to enter cavity 5 through orifice 9. Once cavity 5 is filled, the article is allowed to cool therein due to heat transfer to mold members 3 and 4.

The rate of cooling of the heated material introduced into cavity 5 is influenced mostly by the ability of the mold members to conduct heat away rapidly and efficiently. In the example shown, mold member 4 would tend to participate in this cooling function to a greater extent than mold member 3 because the injected plastic would tend to shrink onto mold member 4 and away from mold member 3 due to contraction during cooling.

The injected material remains in the closed cavity 5 until sufficiently cooled to be removed therefrom without damage.

Thereafter, movable platen 2 is caused to retract away from fixed mold member 3, the article previously formed in cavity 5 now adherring to the movable mold member 4, from which it is then removed by conventional means, such as ejector pins (not shown). The movable mold member is then brought back into engagement with the fixed mold member 3 through the operation of piston 8, all as is well known in the art, and another cycle is begun.

It has heretofore been customary to provide passages within mold members 3 and 4 and to circulate cooling fluid therethrough. The heat transfer from the hot plastic to such cooling fluid was dictated by the limitations upon the placement of said passages, which had to be drilled, or otherwise machined, into the body of these mold members. According to the present invention, not only are such limitations in the placement of cooling passages eliminated, but the heat transfer of the structure is also greatly improved.

Thus, in the exemplary embodiment shown, the mold members to be used in the injection molding operation illustrated in FIGURE 1 are constructed according to the principles of the heat exchanger, shown in my aforementioned Patent No. 3,289,750. Either or both members 3 and 4 may be so constructed. For instance, as schematically shown in FIGURES 2 through 5, movable mold member 4 may comprise cavity forming solid outer element 10, made of tool steel, or other material appropriate to the molding process herein described, metallurgically bonded to pervious layer 11, made of metallic particles, for instance, iron or copper, bonded one to the other, to the outer element 10, and, on the inside, to an inner element 12, which may also be made of steel, and which contains center channel 13.

Figure 2:
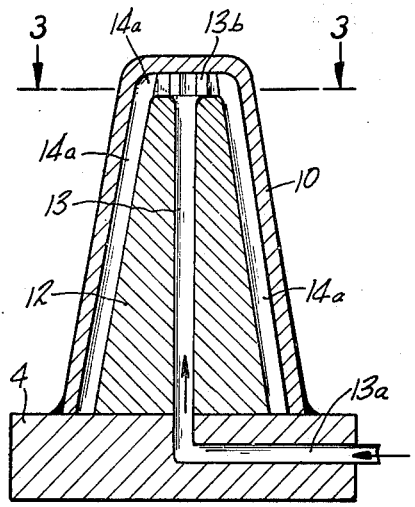
FIGURE 2 is an enlarged sectional view of the mold member or tool employed in FIGURE 1 in accordance with the present invention, taken along the lines 2—2 in FIGURE 3.
Figure 3:
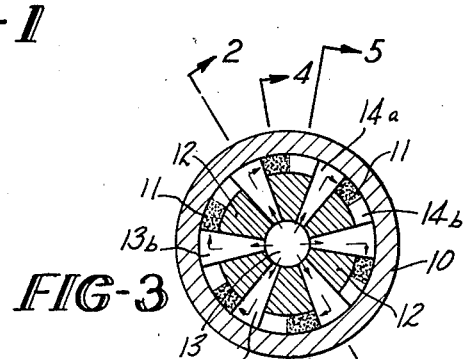
FIGURE 3 is a cross section along the lines 3—3 of FIGURES 2, 4 and 5.
Figure 4:
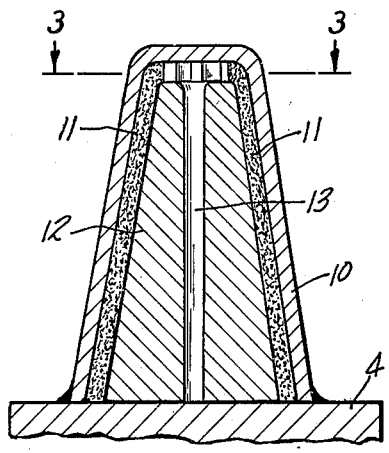
FIGURE 4 is a longitudinal sectional view along the lines 4—4 in FIGURE 3.
Figure 5:
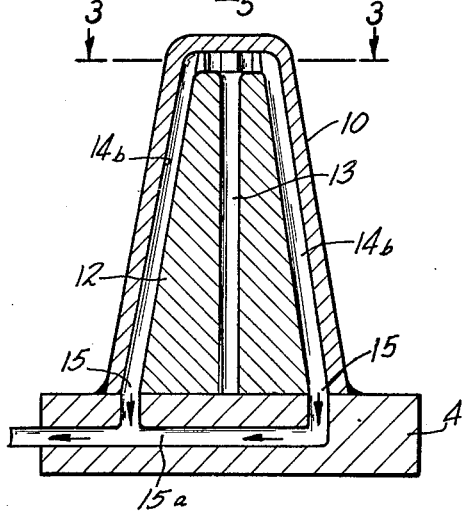
FIGURE 5 is a longitudinal sectional view along the lines 5—5 in FIGURE 3.

A fluid may enter through inlet passage 13a and flow into center channel 13 to be then distributed through channels 13b shown in FIGURES 2 and 3 at the tip of mold member 4 into the substantially parallel channels 14a. Every such channel 14a is closed at the root, i.e., the region adjoining the base of mold member 4 such that the fluid may flow from every first channel 14a to every second channel 14b circumferentially through the particulate porous layer 11 bordered by these two channels as shown in FIGURES 3 and 4. The channels 14b are not blocked at the root of movable mold member 4, and are connected to an outlet manifold space 15, which in turn is connected to outlet passage 15a as shown in FIGURE 5. Thus, fluid will tend to pass at all times at comparatively uniform rates circumferentially along the mold structure providing relatively uniform heat transfer from one end of movable mold member 4 to the other.

In a comparable structure constructed according to conventional procedures wherein holes would be drilled to provide the passage of fluid, the fluid would be at a greater distance from the surface to be cooled than in the example shown; it would tend to heat up unduly as it approaches the outlet passage and due to the obvious limitations of the available heat transfer area in such holes, poor heat transfer would be obtained in passage of the fluid through the structure.

It is readily seen that the arrangement of alternating channels and porous areas must conform to the individual requirements of the mold components to be served, depending on their shape. It is evident, however, that a great variety of porous-channel patterns may be devised to accommodate a wide variety of mold contours and shapes, so that structures of this kind may be provided even when the cavity shapes are complex and the molds consist of more than two major components as shown in the present example.

It will be observed that the above mentioned shaping processes, in some instances, apply appreciable pressures against the mold members, such as for example, those shown as 3 and 4 in FIGURE 1. Thus, in injection molding, the hot flowable plastic is caused to flow into the cavity at pressures ranging up to 20,000 lbs. per sq. inch, while in other processes the pressures may reach several thousand pounds per sq. inch, as in die casting and in the pressing of hot glass. It is thus important that the mold members contain the pressure exerted by the materials to be formed.

If the high pressures of a given process to which the mold components are exposed would tend to damage those sections of the mold components which are juxtaposed to channel areas as exemplified in FIGURES 2 and 3, such as by partial collapse or undue deformation, then such channel areas may be strengthened in accordance with the support procedure described in my copending application S.N. 499,128, now Patent No. 3,365,785. In that application, the channel areas are filled with a highly pervious supporting structure whose resistance to flow of fluid therethrough is vastly lower than the resistance of the porous component used for heat exchange purposes.

In many applications, shaping processes require not merely cooling, but heating, or both heating and cooling in predetermined sequence. Obviously, through appropriate choice of fluids and of their operating temperatures, the mold members may be accordingly heated, cooled, or both.

It is to be understood that the invention is not limited to the illustrations described and shown herein which are deemed to be merely illustrative, and which may be modified as to form, size, arrangement of parts and detail of operation, but rather is intended to encompass all such modifications which are within the spirit and scope of the invention as set forth in the appended claims.

What is claimed is:

1. Apparatus for the shaping of articles comprising a mold member defining at least a part of the desired shape of said article, said mold member having an outer cover defining a molding surface, at least one conduit disposed contiguous to the major portion of the inside surface of said cover adapted to receive a heat exchange medium to exchange heat with said cover, an inlet channel connected to said conduit for introducing said heat exchange medium therein, an outlet channel connected to said conduit for withdrawing said heat exchange medium therefrom, a pervious element within at least a portion of the length of said conduit completely filling said conduit in cross-section, said pervious element being firmly affixed in said conduit, and means for circulating a heat exchange medium through said conduit and through said pervious element to effect heat exchange with said cover.

2. Apparatus according to claim 1 in which a plurality of conduits are provided.

3. Apparatus according to claim 1 in which the mold member has a fixed portion and a movable portion and in which said conduit and pervious element are provided in the movable member.

4. Apparatus according to claim 1 in which the mold member has a fixed portion and a movable portion and in which said conduit and pervious element are provided in the fixed member.

5. Apparatus according to claim 1 in which the mold member has a fixed portion and a movable portion and in which said conduit and pervious element are provided in both the fixed and movable mold members.

6. An apparatus according to claim 1 wherein the pervious element comprises a plurality of metal particles bonded together and to said mold member and to said cover.

References Cited

UNITED STATES PATENTS

| | | |
|---|---|---|
| 2,770,011 | 11/1956 | Kelly. |
| 3,013,304 | 12/1961 | Richie et al. |
| 3,183,292 | 5/1965 | Dvoracek. |
| 3,225,126 | 12/1965 | Bridges et al. |
| 3,289,756 | 12/1966 | Jaeger _____ 29—157.3 X |
| 3,339,200 | 9/1967 | Burne et al. _____ 29—157.3 |
| 3,353,219 | 11/1967 | Snyder _____ 18—35 |
| 3,419,939 | 1/1969 | Shelby _____ 18—35 |

J. HOWARD FLINT, JR., Primary Examiner

U.S. Cl. X.R.

29—157.3; 165—179; 249—38